US007925259B2

(12) United States Patent
Nylander et al.

(10) Patent No.: US 7,925,259 B2
(45) Date of Patent: Apr. 12, 2011

(54) SYSTEM, METHOD, AND ARRANGEMENT FOR MANAGING ACCESS DENIALS IN A WIRELESS COMMUNICATION NETWORK

(75) Inventors: Tomas Nylander, Värmdö (SE); Jari Tapio Vikberg, Järna (SE); Thomas Lars-Erik Lindqvist, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 854 days.

(21) Appl. No.: 11/863,482

(22) Filed: Sep. 28, 2007

(65) Prior Publication Data

US 2008/0081636 A1 Apr. 3, 2008

Related U.S. Application Data

(60) Provisional application No. 60/827,954, filed on Oct. 3, 2006.

(51) Int. Cl.
*H04W 4/00* (2009.01)
*H04W 36/00* (2009.01)
*H04B 7/00* (2006.01)
*H04M 1/00* (2006.01)

(52) U.S. Cl. ............... 455/434; 455/432.1; 455/433; 455/435.1; 455/436; 455/525; 455/561; 370/329

(58) Field of Classification Search .............. 370/329; 340/5.2; 455/432.1, 433, 434, 435.1, 436, 455/437, 444, 445, 446, 449, 525, 561, 433.1
See application file for complete search history.

(56) References Cited

U.S. PATENT DOCUMENTS

| 7,003,297 B2 * | 2/2006 | Willars et al. ............. 455/436 |
| 7,483,702 B2 * | 1/2009 | Yeo et al. ................. 455/449 |
| 2008/0305835 A1 * | 12/2008 | Johnstone et al. .......... 455/561 |

* cited by examiner

*Primary Examiner* — Dwayne D Bost
*Assistant Examiner* — Larry Sternbane

(57) ABSTRACT

A system, method, and arrangement for controlling access to a wireless communication network. When a User Equipment (UE) is denied access to the network through a first access point, the UE stores the Location Area Identity (LAI) utilized at the first access point on a list of forbidden LAIs in the UE. If the LAI stored by the UE is utilized at another access point where the UE is allowed access, the LAI at the other access point is dynamically changed to a second LAI that is not on the UE's list of forbidden LAIs. An access point database stores a table defining which UEs are allowed to utilize each access point. The database also stores a list of rejected LAIs for each UE. A radio network controller accesses the database to determine an allowed LAI, and changes the LAI at the other access points where the UE is allowed access.

13 Claims, 3 Drawing Sheets

SYSTEM, METHOD, AND ARRANGEMENT FOR MANAGING ACCESS DENIALS IN A WIRELESS COMMUNICATION NETWORK

CROSS-REFERENCE TO RELATED APPLICATIONS

This application claims the benefit of U.S. Provisional Application No. 60/827,954, filed Oct. 3, 2006, the disclosure of which is incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates generally to communication networks. More particularly, and without limitation, the present invention is directed to an access control system, method, and arrangement that dynamically reallocates Location Area Identities (LAIs) in a wireless communication network providing home or small area coverage.

Some operators desire to provide home or small area Wideband Code Division Multiple Access (WCDMA) or Global System for Mobile communications (GSM) or Long Term Evolution (LTE)/System Architecture Evolution (SAE) coverage for a limited number of users utilizing a small radio base station (RBS), often referred to for example as a Femto RBS or a Home eNodeB. In the discussion herein, the term Home 3G Access Point (H3GAP) is utilized to refer to the Femto RBSs of the different technologies. The H3GAP provides normal WCDMA coverage for the end users and connects to a femto radio network controller (Femto RNC) using an IP-based transmission. This connection may be made with fixed broadband access such as xDSL, cable, and the like, or alternatively, wireless broadband access such as WiMAX may be utilized.

FIG. 1 is a simplified block diagram of an existing access network architecture 10 providing home or small area WCDMA coverage for a limited number of users utilizing a plurality of femto cells 11. Four femto cells are illustrated for exemplary purposes. The femto cells are overlain by two macro cells 12. The macro cells are controlled by macro RBSs 13. The RBSs connect to a radio network controller (RNC) 14 through an IP/ATM-based transmission 15. Each femto cell is controlled by an associated H3GAP 16. The H3GAPs connect to the RNC through IP-based transmissions 17. The RNC connects to a core network (CN) 18 through an Iu interface 19.

In some cases, the H3GAP may be equipped with a WCDMA receiver making it able to camp on WCDMA cells and read the relevant system information.

The existing network architecture has a number of limitations. First, since a Femto access network is built by the end user plugging in the H3GAP to the broadband connection, the system has to work in a plug-and-play fashion. Also, the number of Location Areas (LAs) is limited. A number of LAs may be allocated for the femto cells controlled by H3GAPs. These LAs are reused and allocated to the H3GAPs. There are only 65,000 LAs available per Public Land Mobile Network (PLMN), so each H3GAP cannot have its own LA. It should also be noted that if a large number of LAs are utilized, this places an extensive operations and maintenance burden on the core network. Therefore, a number of LAs (for example 100-1000) are selected and reused between the H3GAPs.

Another limitation of the existing architecture relates to access control. The access control function prohibits an unauthorized User Equipment (UE) from accessing and utilizing another end user's H3GAP and broadband connection. The rejection of an unauthorized UE may be indicated by a "Location area not allowed" message or a "No suitable cells in location area" reject cause during the Location Updating procedure. When a UE receives one of these messages, the UE stores the identity of the LA (the LAI) in a "forbidden LAIs" list. There may actually be two different forbidden LAIs lists: the "forbidden location areas for regional provision of service" and the "forbidden location areas for roaming", but in either case, the UE retains the forbidden LAIs list until power down or until a predefined time period has expired (12 or 24 hours according to the 3GPP TS 24.008 specification). The UE does not attempt to access any LA on the forbidden LAIs list while the information is stored.

However, this aspect of access control may cause problems due to the reuse of LAs. For example, a given UE being rejected at another end user's H3GAP may have the same LA at its own H3GAP or at another H3GAP the UE is authorized to access. The rejection will cause the UE to store the associated LAI on the forbidden LAIs list. As long as the LAI of the UE's own H3GAP is in the forbidden LAIs list, the UE will not attempt to access its own H3GAP or other H3GAPs it is authorized to use, which have the same LAI.

Accordingly, there is a need for an access control system, method, and arrangement that overcomes the shortcomings of the prior art. The present invention provides such a system, method, and arrangement.

SUMMARY OF THE INVENTION

The present invention provides an automatic process to prevent a UE from being locked out from its own H3GAP or any other H3GAP where the UE is authorized access. If a UE is denied access at a first H3GAP, the invention performs a check to determine whether the same LAI is used at any other H3GAP where the UE is authorized access. If so, the LAI is dynamically changed at the authorized H3GAPs to an LAI that is not on the UE's forbidden LAIs list, thereby enabling access by the UE.

Thus, in one aspect, the present invention is directed to an access control method in a wireless communication network. When a User Equipment (UE) is denied access to the network through a first access point, the UE stores on a list of forbidden LAIs in the UE, a location area identifier (LAI) utilized at the first access point. The method includes the steps of determining whether the LAI stored by the UE on the list of forbidden LAIs is utilized at any other access point where the UE is allowed access; and if so, dynamically changing the LAI at the other access point to a second LAI that is not on the UE's list of forbidden LAIs.

In another aspect, the present invention is directed to an access control system in a wireless communication network, wherein when a UE is denied access to the network through a first access point, the UE stores on a list of forbidden LAIs in the UE, an LAI utilized at the first access point. The system includes means for determining whether the LAI stored by the UE on the list of forbidden LAIs is utilized at any other access point where the UE is allowed access; and means, responsive to a determination that the LAI stored by the UE is utilized at another access point where the UE is allowed access, for dynamically changing the LAI at the other access point to a second LAI that is not on the UE's list of forbidden LAIs.

In yet another aspect, the present invention is directed to an arrangement for controlling access to a wireless communication network, wherein when a UE is denied access to the network through a first access point, the UE stores on a list of forbidden LAIs in the UE, an LAI utilized at the first access point. The arrangement includes a radio network controller; and an access point database accessible by the radio network controller. The database stores a table defining which UEs are allowed to utilize each access point, and a list of rejected LAIs for each UE. Whenever a UE is denied access by an access point, the radio network controller is adapted to store the LAI utilized by the rejecting access point in the list of rejected LAIs for each UE, determine whether the rejected LAI is utilized at any other access point where the UE is allowed access, and if so, dynamically change the LAI at the other access points to an LAI that the UE is allowed to utilize.

BRIEF DESCRIPTION OF THE DRAWINGS

In the following section, the invention will be described with reference to exemplary embodiments illustrated in the figures, in which.

DETAILED DESCRIPTION OF EMBODIMENTS

The description herein describes the present invention in the context of a WCDMA system, but it should be understood that the invention is equally applicable to other types of wireless communication systems such as GSM or LTE/SAE.

If a UE is denied access at a H3GAP, the UE is normally instructed to store the associated LA in its forbidden LAIs list, and the UE does not attempt to access that LA until power is cycled or until a predefined time period has expired. With the present invention, if a UE is denied access at a first H3GAP, the invention performs a check to determine whether the same LAI is used at any other H3GAP where the UE is authorized access. If so, the LAI is dynamically changed at the authorized H3GAPs to an LAI that is not on the UE's forbidden LAIs list, thereby enabling access by the UE. In this manner, an automatic process is implemented to prevent the UE from being locked out from its own H3GAP or any other H3GAP where the UE is authorized access.

Figure 1:
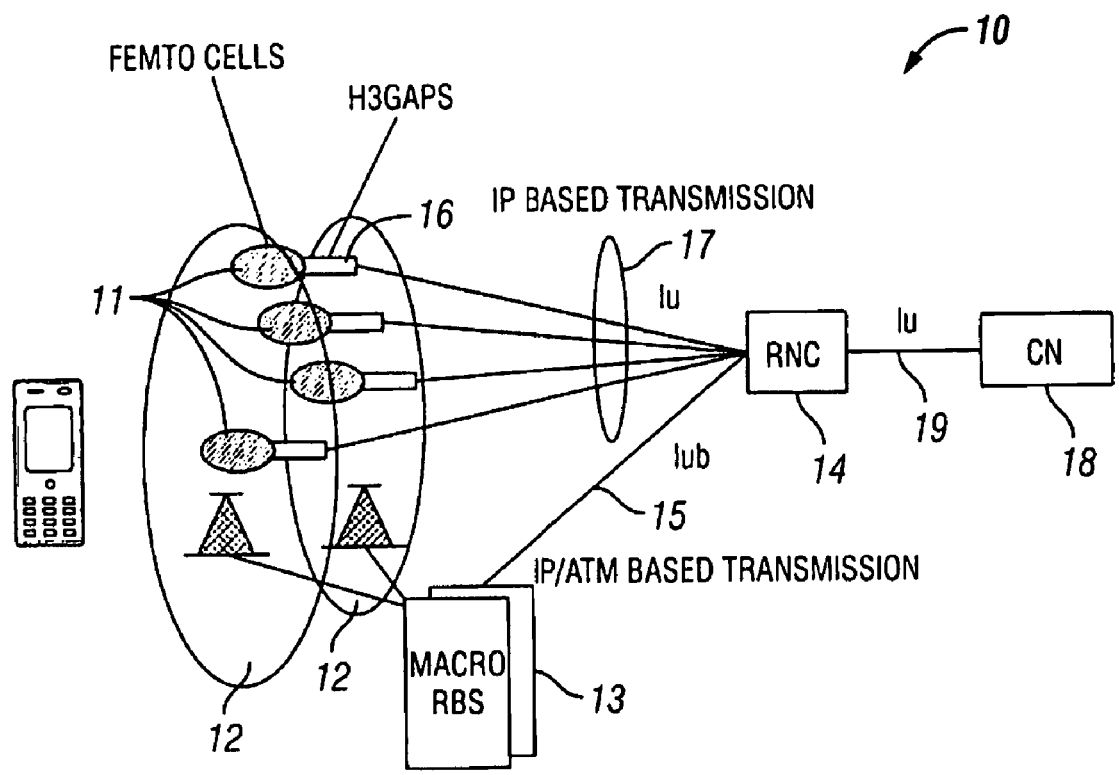
FIG. 1 (Prior Art) is a simplified block diagram of an existing access network architecture providing home or small area WCDMA coverage for a limited number of users utilizing a plurality of femto cells.
Figure 2:
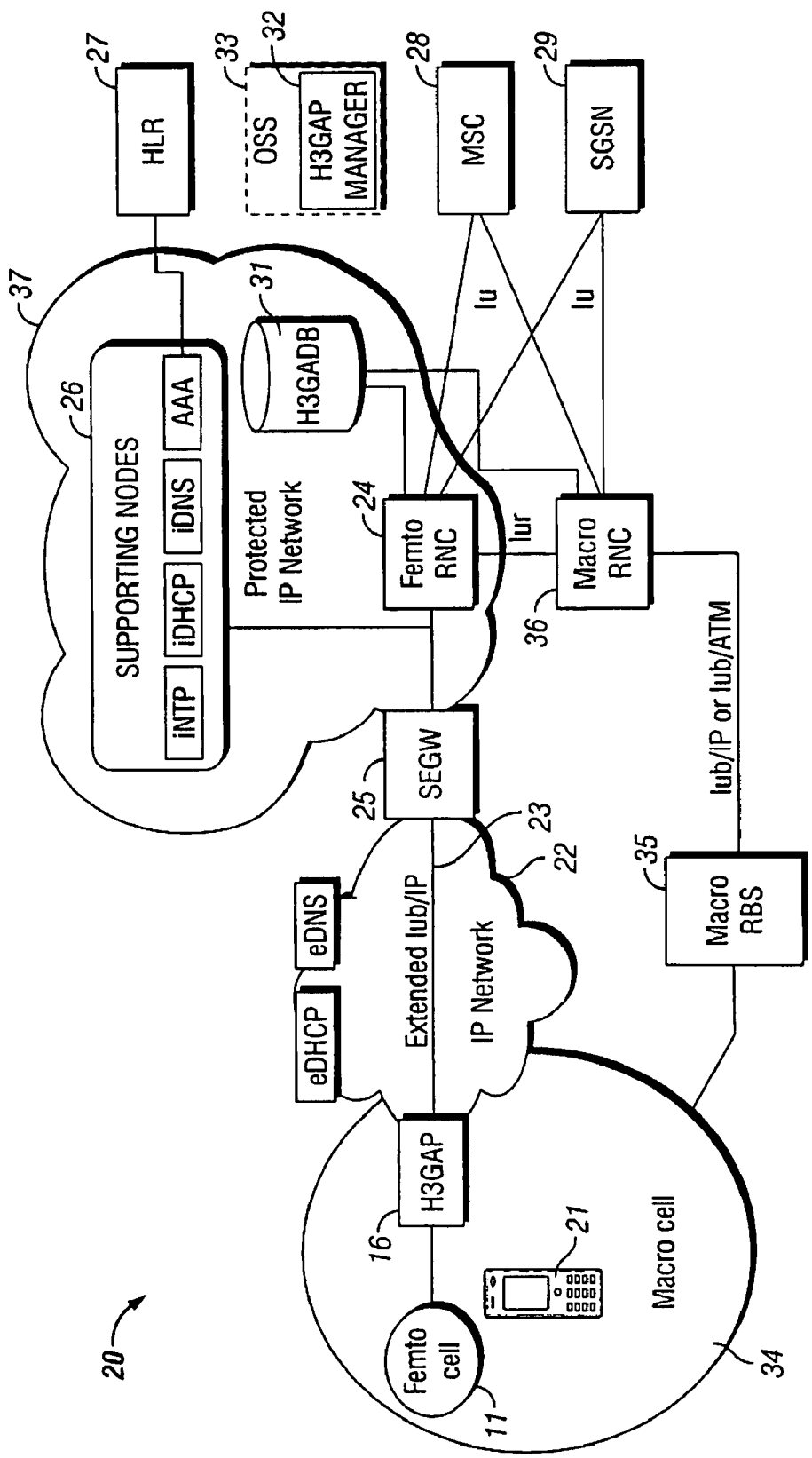
FIG. 2 is a simplified block diagram of an access network architecture in an exemplary embodiment of the system of the present invention.

FIG. 2 is a simplified block diagram of an access network architecture 20 in an exemplary embodiment of the system of the present invention. A UE 21 connects through a femto cell 11, which is controlled by an H3GAP 16. The H3GAP connects through an IP network 22 to a network 37 protected by a Security Gateway (SEGW) 25. The communication may be protected, for example, utilizing IPSec. A Femto RNC 24 and a plurality of supporting nodes 26 such as an internal Network Time Protocol server (iNTP), an internal Dynamic Host Configuration Protocol server (iDHCP), an internal Domain Name System server (iDNS), and a AAA server reside in the protected network 37. Between the H3GAP and the Femto RNC, an extended Iub/IP interface 23 is utilized. The AAA may connect to a Home Location Register (HLR) 27. The Femto RNC connects through Iu interfaces to core network nodes such as a Mobile Switching Center (MSC) 28 and a Serving GPRS Service Node (SGSN) 29. The Femto RNC also connects to an H3GAP database (H3GADB) 31. An H3GAP Manager 32 is implemented within an Operation and Support System (OSS) 33.

The femto cell 11 may be located within the coverage area of a larger macro cell 34. The macro cell is controlled by a Macro RBS 35, which connects to the core network nodes 28, 29 through a macro RNC 36. The Macro RNC also interfaces with the Femto RNC 24 and the H3GADB database 31. In some embodiments the Macro RNC and Femto RNC functionality can be supported in the same physical node.

The present invention utilizes the following data structures.

1. Each Femto RNC 24 is allocated a list of LAIs referred to herein as the Femto_RNC_LAIs list.

2. The H3GAP database 28 contains a table of associations between IMSIs of the UEs and H3GAP-IDs for use by the Access Control function. These associations define which UEs (identified by IMSI) are authorized to use a specific H3GAP (identified by H3GAP-ID).

3. The H3GAP database 28 also contains a table or list of the Rejected LAIs for each UE. This table/list is referred to herein as the Rejected LAIs_per_UE list. This table/list may contain the IMSI, rejected LAI, and a timestamp for each occasion of denied access.

4. The H3GAP database 28 also contains the current allocated LAI for each H3GAP.

Figure 3:
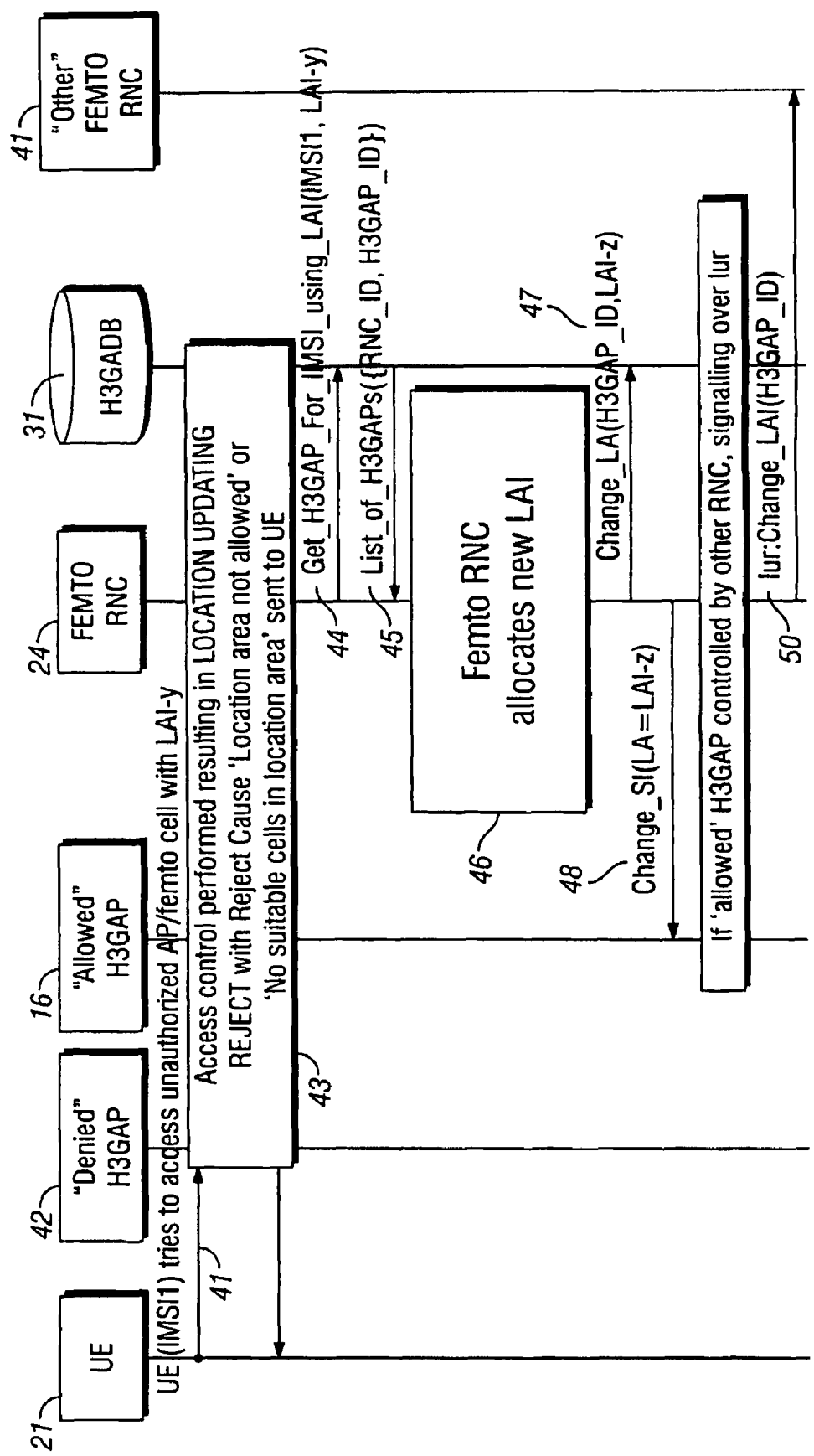
FIG. 3 is a signaling diagram illustrating the flow of messages when dynamically reallocating LAs in an exemplary embodiment of the method of the present invention.

FIG. 3 is a signaling diagram illustrating the flow of messages when dynamically reallocating LAs in an exemplary embodiment of the method of the present invention. At step 41, the UE 21 (having IMSI1) attempts to access an unauthorized H3GAP 42. At step 43, the access control procedure is triggered as normal. In this example, the femto cell in the unauthorized H3GAP has been configured with the Location Area Identity, LAI-y, and the access attempt is rejected with cause "Location Area not allowed" or "No suitable cells in location area". The rejected Location Area Identity (i.e., LAI-y) is stored in the UE 21 in the "forbidden LAIs" list. The Femto RNC 24 also stores the IMSI1, LAI-y, and a timestamp for the access denial in the Rejected LAIs_per_UE list.

TABLE 1

| IMSI | Rejected LAI | Timestamp for Rejection |
|---|---|---|
| 270030101635365 | 270-03-123 | 060919 10:30 |
| 270030101635365 | 270-03-124 | 060919 10:40 |
| 270030101635363 | 270-03-125 | 060919 09:30 |
| 270030101635363 | 270-03-126 | 060919 11:30 |

Table 1 is an example of the logical structure of the Rejected LAIs_per_UE list. The size of the Rejected LAIs_per_UE list may be controlled in several ways. For example, the number of rejected LAIs may be limited to a predefined number such as ten LAIs. The timestamp may also be used as a filter for the number of LAIs. For example, more than ten rejections can be stored in the Rejected LAIs_per_UE list as long as these have occurred during, for example, the last 24 hours. Another example of a filter is the size of the "forbidden LAIs" list in the UE. If the size of this list is, for example ten LAIs, then there may be no need to store more than ten LAIs in the Rejected LAIs_per_UE list.

The example in Table 1 shows two UEs (IMSIs 270030101635365 and 270030101635363) that have been rejected at four different LAIs (270-03-123, 270-03-124, 270-03-125, and 270-03-126). These UEs also happen to have access to the same H3GAP (H3GAP-89), which is not shown in Table 1, but is part of the database for access control. So if there is a need to change the LAI for H3GAP-89, then none of the four LAIs in Table 1 should be selected unless a predefined time period for a UE to hold information about a forbidden LAI has passed.

Still referring to FIG. 3, at step 44, the Femto RNC 24 queries the H3GAP database 31 for all allowed H3GAPs for UE 21 (using IMSI1) that are also currently configured with the LAI-y. At step 45, the database returns a list of H3GAP(s) to the Femto RNC. The list may contain, for example, an RNC-ID and H3GAP-ID for each listed H3GAP. The RNC-ID defines the Femto RNC that is currently controlling each H3GAP.

At step 46, the Femto RNC 24 allocates a new LAI from the pool of LAIs for this Femto RNC (i.e., the Femto_RNC_LAIs list). The Femto_RNC_LAIs list holds all the possible LAIs that can be selected, and may for example contain 100-1000 LAIs. However, the UE may have been rejected access at other H3GAPs (and consequently stored those LAIs as "forbidden"). Therefore, the Femto RNC must ensure that a rejected LAI is not selected when allocating the new LAI.

When a new LAI needs to be selected for a H3GAP, the Femto RNC 24 takes the following logical steps. First, the Femto RNC retrieves a list of all UEs (IMSIs) that are allowed to access this H3GAP. Next, the Femto RNC retrieves all LAIs where the UEs on the retrieved list have been rejected during a preceding predefined time period (for example, during the last 12 or 24 hours). Next, the Femto RNC filters the Femto_RNC_LAIs list by eliminating from consideration, the LAIs that have been rejected during the predefined time period. Finally, the Femto RNC may select one of the remaining LAIs. The above steps may be performed individually, or may be combined in one or more database queries.

If the RNC-ID indicates this Femto RNC 24, the message flow moves to step 47 where the Femto RNC changes the LAI to the selected LAI (H3GAP_ID, LAI-z) in the H3GAP database 31. At step 48, the Femto RNC instructs the H3GAP 16 to change its system information to the selected LAI. However, if the RNC-ID indicates another Femto RNC 49, the message flow skips from step 46 to step 50, where the Femto RNC 24, sends a new message (for example, Change_LAI (H3GAP_ID)) on the Iur interface to the other Femto RNC 49 to request a change. Once the other Femto RNC receives the request, it allocates another LAI from the pool of LAIs as described above at step 46, and then updates the H3GAP database 31 with the new LAI, and updates the system information in the H3GAP 16 as described above in steps 47 and 48.

The present invention thus provides an automatic process to prevent the UE from being locked out from its own H3GAP or any other H3GAP where the UE is authorized access.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

What is claimed is:

1. An access control method in a wireless communication network, wherein when a User Equipment (UE) is denied access to the network through a first access point, the UE stores on a list of forbidden LAIs in the UE, a location area identifier (LAI) utilized at the first access point, said method comprising the steps of:
    storing in an access point database in the network, by a radio network controller, the LAI stored by the UE on the list of forbidden LAIs;
    determining by the radio network controller whether the LAI stored by the UE on the list of forbidden LAIs is utilized at any other access point where the UE is allowed access, wherein the determining step includes querying the access point database by the radio network controller to extract a list of all of the allowed access points for the UE that are currently configured with the LAI stored by the UE; and
    when the LAI stored by the UE is utilized at another access point where the UE is allowed access, dynamically changing by the radio network controller, the LAI at the other access point to a second LAI that is not on the UE's list of forbidden LAIs, thereby enabling the UE to access the wireless communication network through the other access point.

2. The access control method as recited in claim 1, wherein when the first LAI is utilized at a plurality of access points where the UE is allowed access, the method also includes dynamically changing by the radio network controller, the first LAI at the plurality of access points to an allowed LAI that is not on the UE's list of forbidden LAIs.

3. The access control method as recited in claim 1, wherein the step of dynamically changing the LAI at the other access point to a second LAI that is not on the UE's list of forbidden LAIs includes selecting by the radio network controller, an allowed LAI, said selecting step including:
    accessing by the radio network controller, a list of all possible LAIs that can be selected;
    accessing by the radio network controller, a list of rejected LAIs for each UE to determine any unsuitable LAIs for the UE;
    eliminating by the radio network controller, the unsuitable LAIs from consideration; and
    selecting by the radio network controller, as the allowed LAI, an LAI from the LAIs remaining in consideration.

4. The access control method as recited in claim 3, wherein the list of rejected LAIs for each UE includes a UE identifier, a rejected LAI, and an associated timestamp for each occurrence of denied access of a UE in the network, and the method also includes removing by the radio network controller, a rejected LAI from the list of rejected LAIs for each UE when a predefined time period has elapsed since the associated timestamp.

5. An access control system in a wireless communication network, wherein when a User Equipment (UE) is denied access to the network through a first access point, the UE stores on a list of forbidden LAIs in the UE, a location area identifier (LAI) utilized at the first access point, said system comprising:
    means within a radio network controller for storing in an access point database in the network, the LAI stored by the UE on the list of forbidden LAIs;
    means for determining whether the LAI stored by the UE on the list of forbidden LAIs is utilized at any other access point where the UE is allowed access, wherein the determining means includes means within the radio network controller for querying the access point database to extract a list of all of the allowed access points for the UE that are currently configured with the LAI stored by the UE: and means within the radio network controller for dynamically changing the LAI at the other access point to a second LAI that is not on the UE's list of forbidden LAIs, in response to a determination that the LAI stored by the UE is utilized at another access point where the UE is allowed access, thereby enabling the UE to access the wireless communication network through the other access point.

6. The access control system as recited in claim 5, wherein when the first LAI is utilized at a plurality of access points where the UE is allowed access, the system also includes means within the radio network controller for dynamically changing the first LAI at the plurality of access points to an allowed LAI that is not on the UE's list of forbidden LAIs.

7. The access control system as recited in claim 5, wherein the means for dynamically changing the LAI at the other access point includes means within the radio network controller for selecting an allowed LAI, said selecting means being adapted to:
   access a list of all possible LAIs that can be selected;
   access a list of rejected LAIs for each UE to determine any unsuitable LAIs for the UE;
   eliminate the unsuitable LAIs from consideration; and
   select as the allowed LAI, an LAI from the LAIs remaining in consideration.

8. The access control system as recited in claim 7, wherein the list of rejected LAIs for each UE includes a UE identifier, a rejected LAI, and an associated timestamp for each occurrence of denied access of a UE in the network, and the system also includes means for removing a rejected LAI from the list of rejected LAIs for each UE when a predefined time period has elapsed since the associated timestamp.

9. An arrangement for controlling access to a wireless communication network, wherein when a User Equipment (UE) is denied access to the network through a first access point, the UE stores on a list of forbidden LAIs in the UE, a location area identifier (LAI) utilized at the first access point, said arrangement comprising:
   a radio network controller; and
   an access point database accessible by the radio network controller, said database storing a table defining which UEs are allowed to utilize each access point, and a list of rejected LAIs for each UE;

wherein whenever a UE is denied access by an access point, the radio network controller is adapted to:
   store the LAI utilized by the rejecting access point in the list of rejected LAIs for each UE;
   determine whether the rejected LAI is utilized at any other access point where the UE is allowed access; and
   if so, dynamically change the LAI at the other access points to an LAI that the UE is allowed to utilize.

10. The arrangement as recited in claim 9, wherein the list of rejected LAIs for each UE includes a UE identifier, a rejected LAI, and an associated timestamp for each occurrence of denied access of a UE in the network, and the radio network controller includes means for removing a rejected LAI from the list of rejected LAIs for each UE when a predefined time period has elapsed since the associated timestamp.

11. A radio network controller for controlling access to a wireless communication network, wherein when a User Equipment (UE) is denied access to the network through a first access point, the UE stores on a list of forbidden LAIs in the UE, a location area identifier (LAI) utilized at the first access point, said radio network controller comprising:
   means for determining whether the LAI stored by the UE on the list of forbidden LAIs is utilized at any other access point where the UE is allowed access; and
   means for dynamically changing the LAI at the other access point to a second LAI that is not on the UE's list of forbidden LAIs, responsive to a determination that the LAI stored by the UE is utilized at another access point where the UE is allowed access.

12. The radio network controller as recited in claim 11, further comprising means for storing the LAI utilized by the rejecting access point in a list of rejected LAIs for each UE.

13. The radio network controller as recited in claim 12, further comprising:
   means for determining whether the other access point where the UE is allowed access is controlled by another radio network controller; and
   means for instructing the other radio network controller to change the LAI at the other access point, upon determining that the other access point is controlled by the other radio network controller.

* * * * *